(12) United States Patent
Qureshi et al.

(10) Patent No.: US 7,477,782 B2
(45) Date of Patent: Jan. 13, 2009

(54) SYSTEM AND METHOD FOR CLASSIFYING FOLLICULAR UNITS

(75) Inventors: Shehrzad A. Qureshi, Palo Alto, CA (US); Mohan Bodduluri, Palo Alto, CA (US)

(73) Assignee: Restoration Robotics, Inc., Mountain View, CA (US)

( * ) Notice: Subject to any disclaimer, the term of this patent is extended or adjusted under 35 U.S.C. 154(b) by 160 days.

(21) Appl. No.: 11/467,268

(22) Filed: Aug. 25, 2006

(65) Prior Publication Data

US 2008/0049992 A1 Feb. 28, 2008

(51) Int. Cl.
*G06K 9/00* (2006.01)
(52) U.S. Cl. .................................. 382/171; 606/187
(58) Field of Classification Search ................. 382/171; 606/9, 133, 187, 13, 167; 424/73, 70.1, 727, 424/60; 128/898; 514/2, 859, 880, 165, 514/848, 21, 513, 12, 44; 435/6, 69.1, 320.1, 435/7.1
See application file for complete search history.

(56) References Cited

U.S. PATENT DOCUMENTS

| 4,807,163 | A | 2/1989 | Gibbons |
| 5,331,472 | A | 7/1994 | Rassman |
| 5,895,403 | A | 4/1999 | Collinsworth |
| 6,585,746 | B2 | 7/2003 | Gildenberg |
| 6,949,115 | B2* | 9/2005 | Mascio ........................ 607/88 |
| 6,973,931 | B1 | 12/2005 | King |
| 7,094,569 | B2* | 8/2006 | Kim et al. .................. 435/69.1 |
| 7,130,717 | B2* | 10/2006 | Gildenberg ................. 700/245 |
| 7,277,120 | B2 | 10/2007 | Gere et al. |
| 7,335,641 | B2* | 2/2008 | Kim et al. ..................... 514/12 |

(Continued)

OTHER PUBLICATIONS

Inaba, M. and Inaba, Y., "Androgenetic Alopecia, Modern Concepts of Pathogenesis and Treatment", 29. Operative Treatement for Androgenetic Alopecia, Springer, 1996, pp. 238-244, 309. (9 pages).

(Continued)

*Primary Examiner*—Sheela C Chawan
(74) *Attorney, Agent, or Firm*—Vista IP Law Group LLP

(57) ABSTRACT

A system and method for classifying follicular units based on the number of hairs in a follicular unit of interest comprises (i) acquiring a digital image of a body surface having a follicular unit of interest; (ii) selecting a region of interest with the digital image which contains the follicular unit; (iii) segmenting the selected image to produce a binary image wherein the binary image defines a contour of the follicular unit; (iv) calculating an outline profile of the binary image which disregards concavities in the contour; and (v) determining the number of defects in the outline profile to determine the number of hairs in the follicular unit. The system and method may also adjust for hairs which converge beneath the skin and for images which appear as a single wide hair but which are actually multiple hairs.

22 Claims, 8 Drawing Sheets

U.S. PATENT DOCUMENTS

| | | | |
|---|---|---|---|
| 2001/0015380 A1 | 8/2001 | Good et al. | |
| 2006/0089555 A1 | 4/2006 | Grummer et al. | |
| 2007/0078466 A1* | 4/2007 | Bodduluri et al. | 606/133 |
| 2007/0106306 A1* | 5/2007 | Bodduluri et al. | 606/133 |
| 2007/0106307 A1* | 5/2007 | Bodudluri et al. | 606/133 |
| 2008/0002809 A1 | 1/2008 | Bodduluri | |
| 2008/0004633 A1 | 1/2008 | Arata et al. | |

OTHER PUBLICATIONS

PCT International Search Report for PCT/US07/76726, Forms PCT/ISA/220 and 210, Applicant Restoration Robotics, Inc., dated Apr. 24, 2008, (5 pages).

PCT Written Opinion of the International Searching Authority, for PCT/US07/76726, Forms PCT/ISA/237, Applicant Restoration Robotics, Inc., dated Apr. 24, 2008, (6 pages).

PCT International Search Report for PCT/US07/76728, Forms PCT/ISA/220 and 210, Applicant Restoration Robotics, Inc., dated Apr. 17, 2008, (4 pages).

PCT Written Opinion of the International Searching Authority, for PCT/US07/76728, Forms PCT/ISA/237, Applicant Restoration Robotics, Inc., dated Apr. 17, 2008, (8 pages).

Fisher, Robert, S. Perkins, A. Walker and E. Wolfart, "Gaussian Smoothing", retrieved on Feb. 26, 2008 from the Internet <URL: http://homepages.inf.ed.ac.uk/rbf/HIPR2/gsmooth.htm>, 2003, pp. 1 to 8, (8 pages).

* cited by examiner

SYSTEM AND METHOD FOR CLASSIFYING FOLLICULAR UNITS

FIELD OF INVENTION

This invention relates generally to hair transplantation procedures and more particularly to a system and method for classifying follicular units using digital imaging and processing techniques for use in hair transplantation procedures.

BACKGROUND

Hair transplantation procedures are well-known, and typically involve (in a patient having male pattern baldness) harvesting donor hair grafts from the side and back fringe areas (donor areas) of the patient's scalp, and implanting them in a bald area (recipient area). Historically, the harvested grafts were relatively large (3-5 mm), although more recently, the donor grafts may be single follicular units. In particular, "follicular units" (also referred to herein as FU or FUs) are naturally occurring aggregates of 1-3 (and much less commonly, 4-5) closely spaced hair follicles that are distributed randomly over the surface of the scalp.

The follicular units may be classified, or "typed," based on the number of hairs in the unit and identified in shorthand as an "F1" for a single hair follicular unit, an "F2" for a two hair follicular unit and so on for follicular units with 3-5 hairs. In some cases of multiple hair follicular units, the hairs may appear to emanate from a single follicle or point in the skin. In other cases, the hairs may exit the skin surface at slightly spaced apart positions, but converge into a single follicular unit beneath the skin. Referring to FIG. 1, a print of a digital image of an exemplary section of a human scalp 11 having a variety of types of follicular units is shown. For example, the follicular unit 13 has two hairs and is therefore an F2, while follicular unit 15 is an F1 since it has only a single hair. Similarly, follicular unit 17 appears to be an F3 having three hairs.

There are several reasons it is important and desirable to identify and classify follicular units based on the number of hairs in the follicular unit. For one, it is preferable to transplant certain classes of follicular units into specific regions of the scalp. For example, single hair follicular units (F1s) are commonly implanted along the hairline that frames the face. Follicular units with more than one hair (F2s, F3s, etc.) are commonly implanted in the mid-scalp and crown. This arrangement of follicular unit distribution is thought to produce a more natural appearing aesthetic result. Still, it may be desirable to utilize a variety of classes (also referred to as "types") of follicular units to provide the desired attributes for the appearance of the transplanted hair. Such attributes can include the density of hair, the direction or orientation of hair, the particular mix of types of follicular units, and/or the appearance of randomness, among other possible attributes.

Various procedures for hair transplantation have been previously disclosed, including both manual and mechanized to certain degrees of automation. In one well-known manual process, a linear portion of the scalp is removed from a donor area by dissection with a scalpel down into the fatty subcutaneous tissue. The strip is dissected (under a microscope) into the component follicular units, which are then implanted into a recipient area in respective puncture holes made by a needle. Forceps are typically used to grasp and place the follicular unit grafts into the needle puncture locations, although other instruments and methods are known for doing so.

In "Androgenetic Alopecia" (Springer 1996), M. Inaba & Y. Inaba disclose and describe a manual method for harvesting singular follicular units by positioning a hollow punch needle having a cutting edge and interior lumen with a diameter of 1 mm, which is about equal to the diameter of critical anatomical parts of a follicular unit. The needle punch is axially aligned with an axis of a follicular unit to be extracted and then advanced into the scalp to cut the scalp about the circumference of the selected follicular unit. Thereafter, the follicular units are easily removed, e.g., using forceps, for subsequent implantation into a recipient site with a specially devised insertion needle.

U.S. Pat. No. 6,585,746 discloses an automated hair transplantation system utilizing a robot, including a robotic arm and a hair follicle introducer associated with the robotic arm. A video system is used to produce a three-dimensional virtual image of the patient's scalp, which is used to plan the scalp locations that are to receive hair grafts implanted by the follicle introducer under the control of the robotic arm. [The entire disclosure of U.S. Pat. No. 6,585,746 is incorporated herein by reference.]

Automated systems and methods for transplanting are also disclosed in U.S. provisional patent application Ser. Nos. 60/722,521, filed Sep. 30, 2005, 60/753,602, filed Dec. 22, 2005, and 60/764,173, filed Jan. 31, 2006, and U.S. patent application Ser. No. 11/380,903, filed Apr. 28, 2006 and Ser. No. 11/380,907, filed Apr. 28, 2006. [The foregoing applications are all hereby incorporated by reference into the present application in their entirety.]

For example, U.S. patent application Ser. No. 11/380,907, referenced above, the disclosed system comprises a robotic arm having a harvesting and/or implantation tool mounted on the arm. One or more cameras are also mounted on the arm and are used to image the work space, such as a body surface. A processor is configured to receive and process images acquired by the cameras. A controller is operatively coupled to the processor and the robotic arm. The controller controls the movement of the robotic arm based, at least in part, on the processed images acquired by the cameras and the processor. The arm is controllably moveable to position the tool at a desired orientation and position relative to the body surface to perform transplantation of hairs.

In utilizing any of these systems and methods for hair transplantation, it is desirable to first plan the transplantation to select the follicular units to be harvested and transplanted and to determine the precise location where the hairs are to be implanted. Accordingly, in planning a hair transplantation procedure, specific follicular units from a specific location on a body surface may be selected for harvesting and transplantation into a different part of the body surface. The follicular units to be transplanted may be selected based on certain criteria, for example, the type of follicular unit (i.e. F1, F2, etc.), the orientation of the hair in the follicular unit, the density of the hair, etc. However, the process of counting and characterizing each follicular unit can be tedious and time consuming. Therefore, there is a need for a system and method for classifying follicular units using an automated system.

SUMMARY

In accordance with a general aspect of the inventions disclosed herein, a system and method for classifying follicular units using an automated system is provided. The system and method of the present invention may be utilized with systems and methods for transplantation of hair follicular units on a body surface, such as a human scalp. The system and method of the present invention is especially useful when implemented on, or integrated with, an automated system for hair transplantation.

In one aspect of the present invention, the method of classifying follicular units comprises first acquiring a digital image of a body surface in which there are follicular units. A region of interest within the digital image which is known to contain a follicular unit (FU) is selected. The selected image is segmented to produce a binary image of the FU. The binary image of the FU defines a contour around the outer perimeter of the hair(s) of the FU. For example, for an F1, the contour would generally be a line or surface following the outer surface of the single hair. For a relatively straight hair, the contour would look like a rectangle. For an F2, the hairs typically form a "V" shape such that the contour looks like a block lettered "V".

Next, an outline profile of the binary image is calculated. The outline profile disregards concavities in the contour of the image. For instance, for an F2, there is a concavity or "inwardly curved" portion in the contour formed by the descent in the contour from the one side of the top of the "V" to the vertex of the "V" and back up to the other side of the top of the "V". The calculated profile disregards this concavity such that the resulting outline profile looks like a triangle with one of the vertices of the triangle generally tracing the vertex of the "V" of the contour of the FU.

The outline profile is then compared to the contour to determine the number of "defects" in the outline profile. A defect in the outline profile is each of the concavities in the outline profile which divert from the contour. In the F2 example, there is one defect in the outline profile represented by the concavity formed by the "V" shape. In an F3, the contour will be generally shaped like two Vs sharing a common vertex and with one line forming one side of both Vs. The outline profile of an F3 will also have a generally triangular shape (although it may be a wider triangle than an F2). Thus, an F3 will have two defects. Therefore, it can be seen that the number of defects has a direct relationship to the type of follicular unit. In this case, the number of hairs for the FU equals the number of defects minus one.

In another aspect of the method of classifying follicular units, the outline profile is determined by calculating a convex hull contour pursuant to well-known image processing techniques.

In another embodiment of the method of the present invention, the step of acquiring the digital image of the body surface includes a method for tracking the FU of interest and aligning the camera(s) to obtain the digital image. First and second cameras which provide stereo images. The stereo images may be used to track an FU of interest within the digital images of the first and second cameras to adjust for movement of the body surface and/or movement of the cameras. In addition, the first and second cameras are aligned with the general orientation of the hair of the FU. In this way, a digital image is obtained which provides good quality data for performing the remaining steps of the method of classifying the used to classify the FU.

In still another aspect of the present invention, the method of classifying a follicular unit may also adjust for follicular units having hairs which converge below the surface of the skin. In such case, the image will contain an image of a hair which is not a contiguous part of the contour of the FU of interest. To account for this situation, it is determined whether the separate hair is within a maximum distance from the hair(s) defining the contiguous contour of the FU of interest. The maximum distance is set to be a distance in which what appears to be a hair from a separate FU is most likely a part of the same FU as the FU of interest. The classification of the FU of interest then takes into account any additional hair(s) which are within a maximum distance from the hair(s) of the FU of interest.

In yet another aspect of the present invention, the method of classifying a follicular unit may also adjust for hair images which appear to be a single hair but are in actuality multiple hairs. If the digital image is taken at a certain angle to the hairs of an FU, the image of the hairs may merge and appear to be one hair. Thus, determining the number of defects will not provide an accurate classification because the merged hairs will result in less defects in the outline profile (and therefore less hairs) than are actually present in the FU of interest. To account for this situation, the method determines the width of each object representing a hair in the FU of interest using the digital image. Then, it is determined whether the width of each object representing a hair exceeds a maximum expected width for a single hair. The step of classifying the FU is also based on a determination whether the width of an object representing a hair exceeds the maximum expected width. For example, if the width is between 1½ and 2 times the expected width, then the step of classifying will approximate such object as being two hairs. A similar approximation can be done for 3, 4 or 5 hairs.

The system for classifying follicular units using an automated system may comprise any of the transplantation systems described in the background above. For instance, the system described in U.S. patent application Ser. No. 11/380,907 may programmed and configured to perform the methods of classifying a follicular unit according to the present invention. The cameras on the system can provide stereo digital images and the robotic arm can properly position and orient the cameras. The selection of region of interest may be performed by an operator at the user interface of the system (such as a computer having a monitor and input devices) or it could be automated through programming of the computer and/or controller.

Accordingly, a system and method for classifying follicular units is provided. Other and further embodiments, objects and advantages of the invention will become apparent from the following detailed description when read in view of the accompanying figures.

BRIEF DESCRIPTION OF THE DRAWINGS

The invention is illustrated by way of example and not limitation in the figures of the accompanying drawings, in which like references indicate similar elements, and in which.

DETAILED DESCRIPTION OF THE ILLUSTRATED EMBODIMENTS

Figure 1:
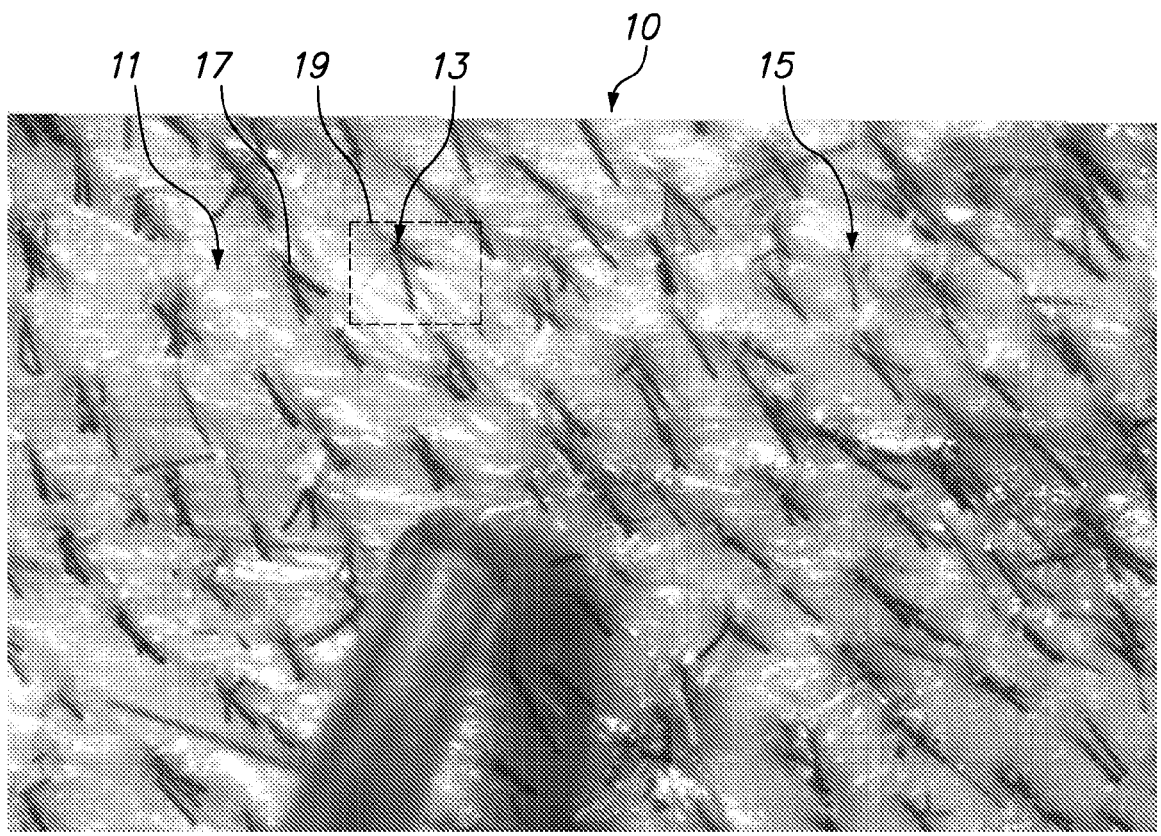
FIG. 1 is a print of a digital image of an exemplary section of a human scalp showing a variety of types of follicular units and a selected region of interest.

Referring first to FIG. 1, the system and method for classifying follicular units according to the present invention generally begins with acquiring a digital image 10 of a body surface 11 using one or more digital cameras. The photo of FIG. 1 is an image of a section of human scalp 11, but it is understood that the body surface could be any area of any body having hair. The digital image 10 shows a variety of types of follicular units (FU) on the scalp 11, including a single hair (F1) follicular unit 15, a two hair (F2) follicular unit 13, and a three hair (F3) follicular unit 17.

The digital image 10 may be acquired using one or more digital cameras of an automated hair transplantation system, such as the cameras described in the hair transplantation system of U.S. patent application Ser. No. 11/380,907, which is incorporated by reference herein in its entirety. The image from just one of the cameras can be used to produce the digital image 10. Alternatively, the process for obtaining the digital image 10 may be acquired by a more involved process which aligns the camera(s) to improve the image used to classify a follicular unit of interest. In this process, a first camera and a second camera are used. The cameras are arranged and configured to obtain stereo images of a body surface at which they cameras are directed. The cameras are first positioned to be directed at the body surface in an area known to have hair. A first digital image is acquired from the first camera and a follicular unit (FU) of interest is selected from within the first digital image. A second digital image of about the same region of the body surface as the first camera (except from a slightly different angle as provided by stereo cameras) is acquired from the second camera and the same FU of interest is selected from within the second digital image. The FU of interest can be selected in the digital images by an operator of the system or automatically by the system using a selection algorithm. The transplantation system is now able to track the FU of interest within the first and second digital images from the first and second cameras. The tracking procedure can be used to adjust for movement of the body surface and movement of the cameras when they are aligned to acquire the digital image(s) used for classifying the FU. Next, the first and second cameras are moved and oriented to be aligned with the general orientation of the hair of the FU. As the cameras are moved, additional digital images may be acquired and processed by the system in order to track the FU of interest. By aligning the cameras with the hair of the FU, a better digital image for classifying the FU can be acquired. With the cameras in the desired alignment, the cameras acquire the digital images to be used in the next steps of the method of classifying a follicular unit.

Figure 2:
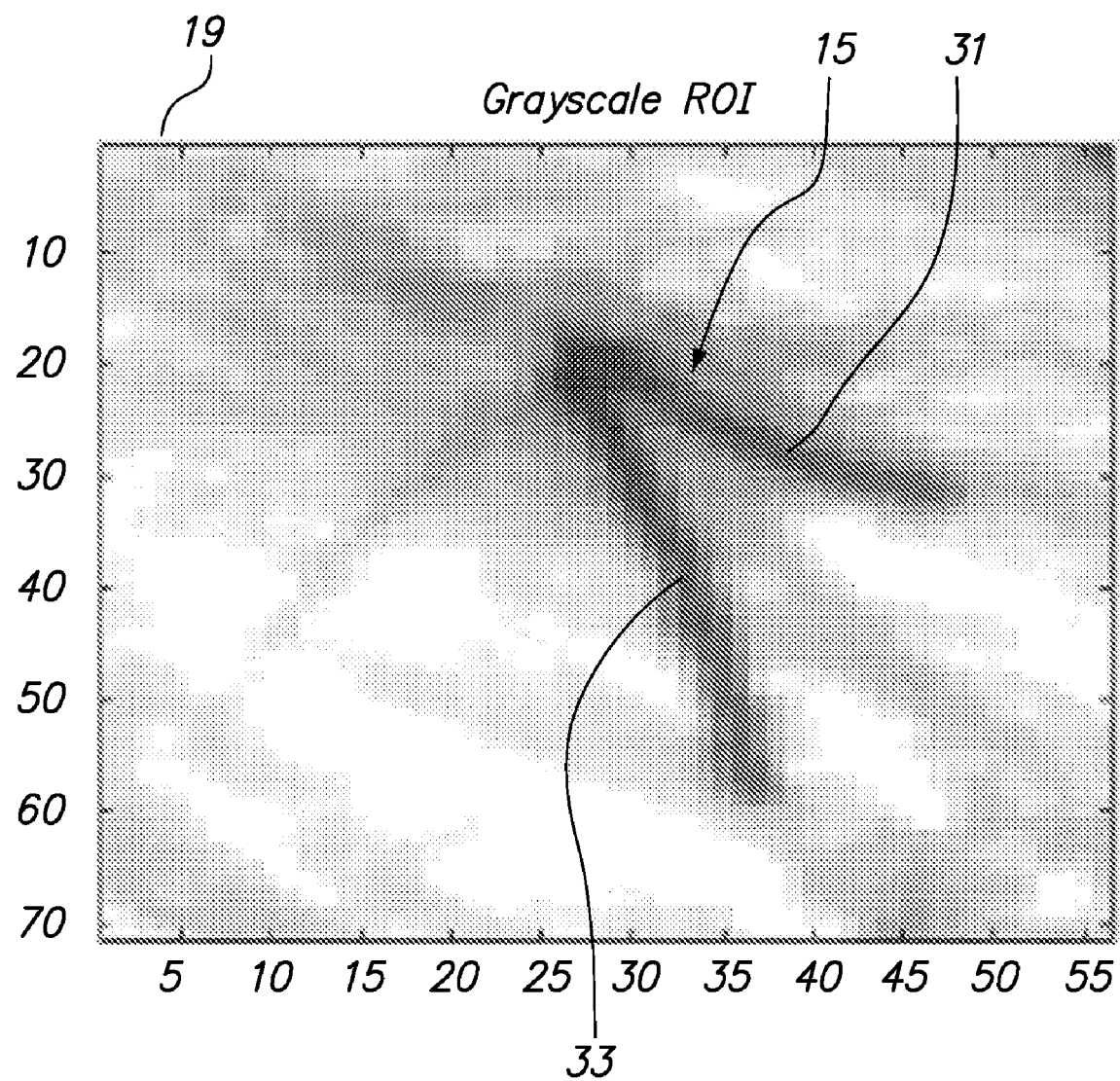
FIG. 2 is a print of a digital image of a single follicular unit.
Figure 3:
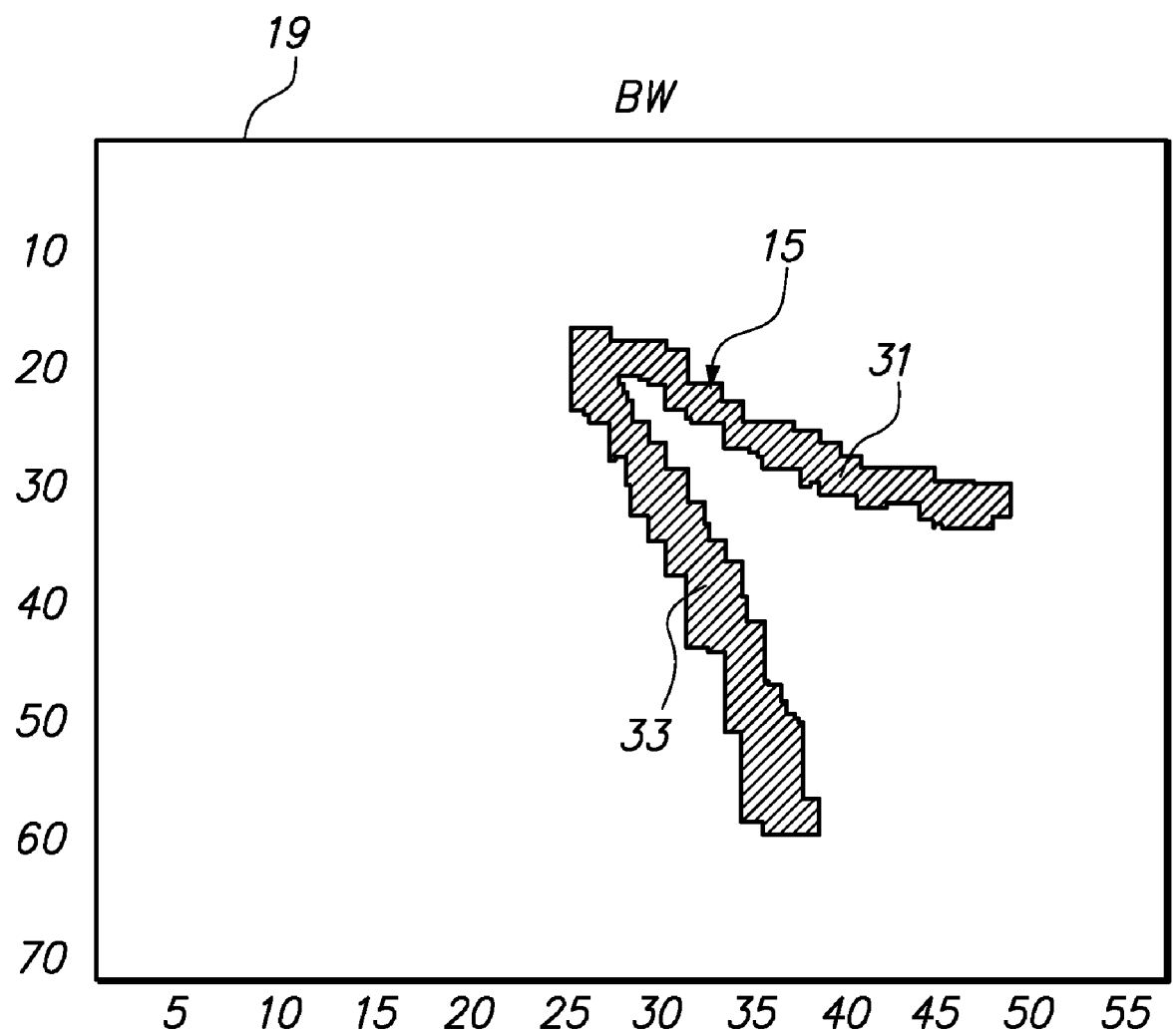
FIG. 3 is a print of the digital image of FIG. 2 after the image has been segmented.

After the digital image 10 is acquired, a region of interest 19 which is known to contain the FU 13 of interest (the FU to be classified) is selected. The region of interest 19 may be selected by an operator or the selection may be automated by the system. Turning to FIG. 2, the region of interest 19 is shown as a grayscale of the hairs 31 and 33 of the FU 13. This grayscale digital image of the region of interest 19 is then segmented using well-known digital image processing techniques to produce a binary image of the FU 13. FIG. 3 shows binary image of the digital image of FIG. 2 after it has been segmented.

The outer perimeter of the hairs 31 and 33 of the binary image defines a contour 35 the FU 13. A demonstrative representation of the contour 35 is shown as a dashed line 35 in FIG. 4. In the method of the present invention, a contour 35 may be calculated around the perimeter of the binary image of the hairs 31 and 35, or the pixels making up the outer perimeter of the binary image may be used. As clearly shown in FIG. 4, the contour 35 for an FU having two hairs looks like a block lettered "V".

Figure 4:
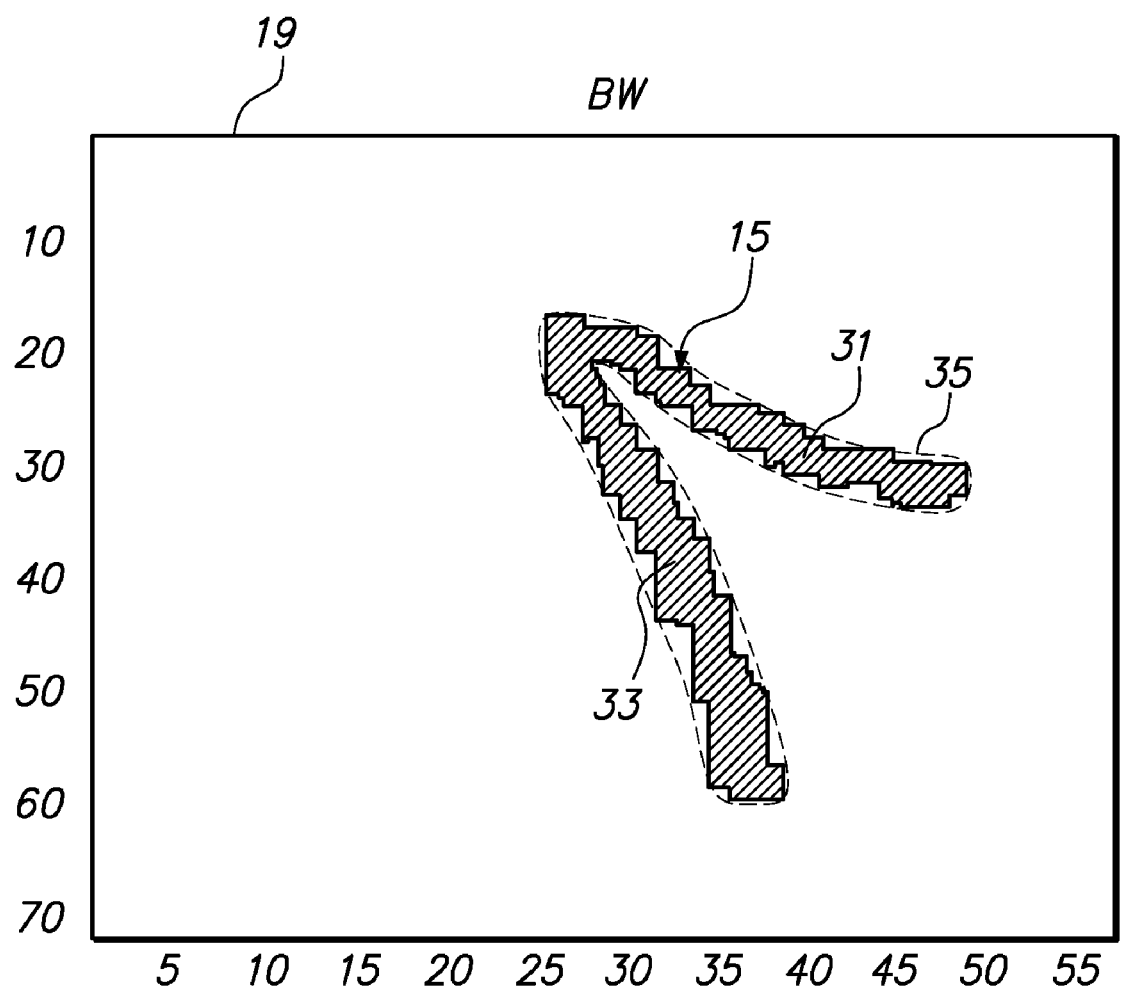
FIG. 4 is print of the digital image of FIG. 3 with an exemplary contour of the hairs of the follicular unit depicted with a dashed line.
Figure 5:
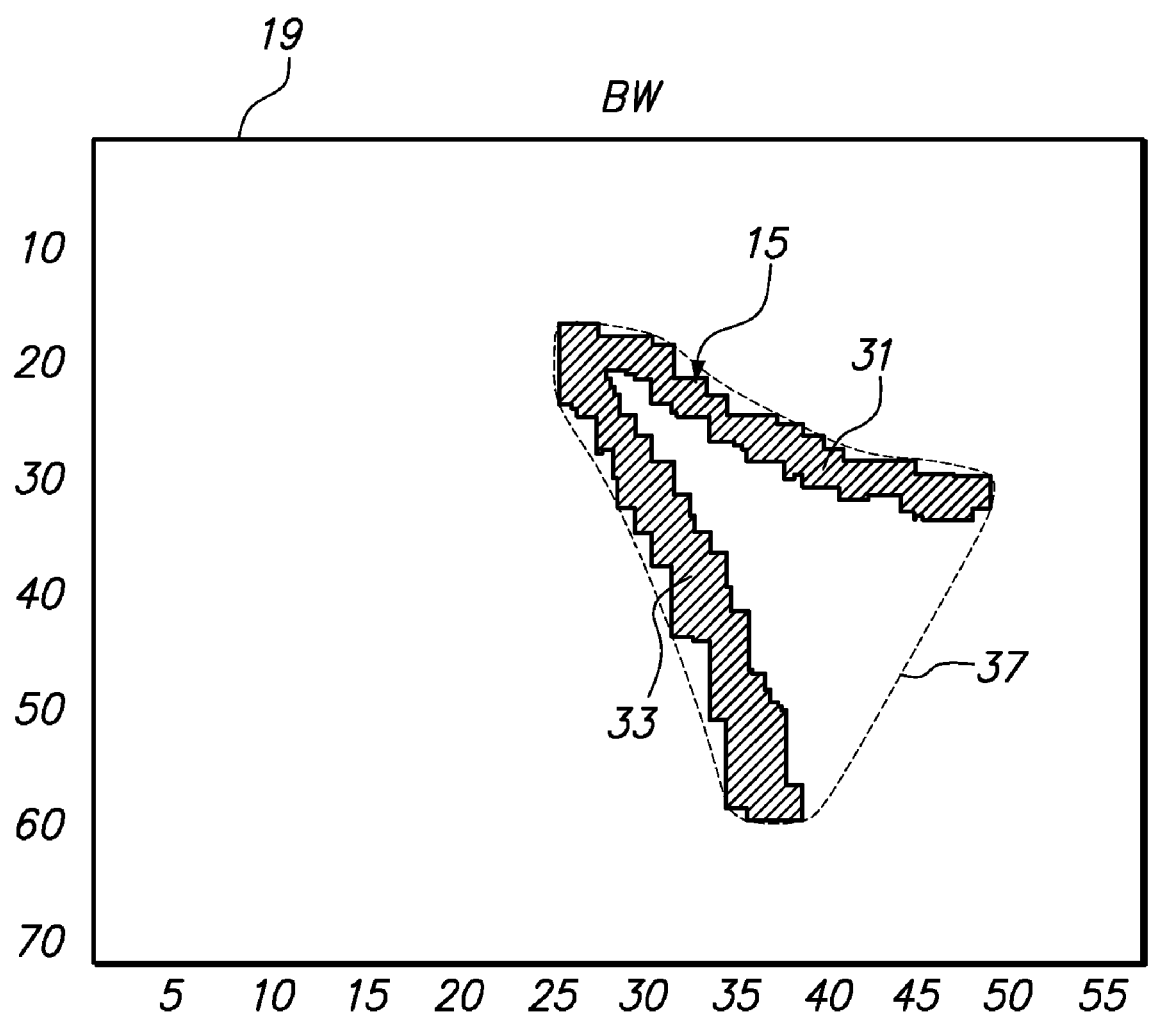
FIG. 5 is a print of the digital image of FIG. 3 with an exemplary outline profile of the hairs of the follicular unit depicted with a dotted line.

Next, an outline profile 37 of the binary image of the FU 15 is calculated. The outline profile 37 is an outline of the geometry of the image with concavities removed. In the present example using the binary image of FU 15 as depicted in FIGS. 3-5, the concavity which will be removed is the space between the two legs of the V-shape. Thus, the calculated outline profile 37 of the binary image of the FU 15 will be a line around the shape having a generally triangular shape as demonstratively represented by the dotted line 37 in FIG. 5. The outline profile may be calculated using any suitable algorithm as known by those of ordinary skill in the art. For example, the outline profile 37 may be determined by calculating a convex hull using well-known image processing techniques.

Figure 6:
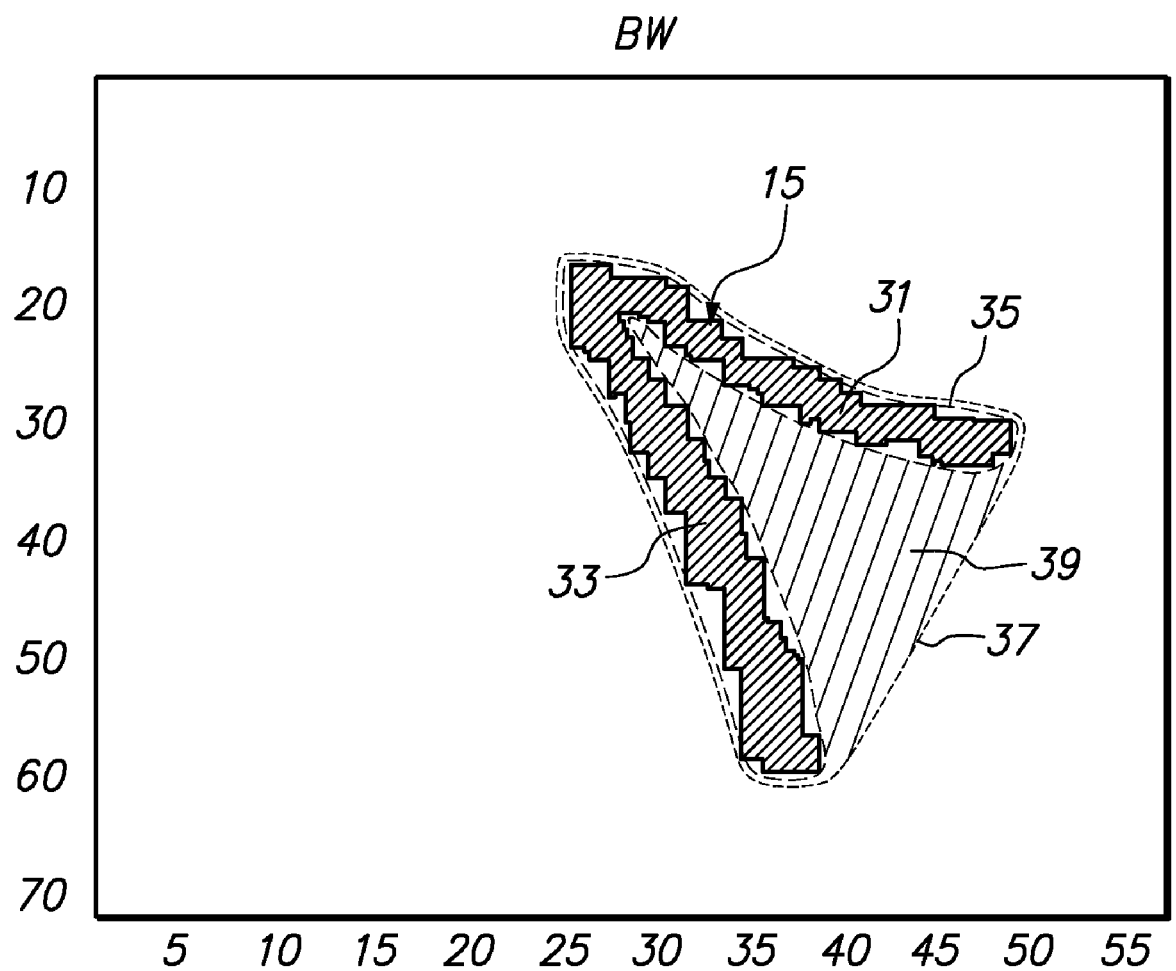
FIG. 6 is a print of the digital image of FIG. 3 showing the defects in the outline profile as compared to the contour of the hairs of the follicular unit.

The outline profile 37 is then compared to the contour 35 to determine the number of concavities that were removed. The concavities that are removed in producing the outline profile are commonly called "defects" in the outline profile. A schematic representation of the step of comparing the outline profile 37 to the contour 35 is shown in FIG. 6. As can be seen in FIG. 6, there is a single defect 39 in the image of FU 15 which is shown as the hatched area.

The number of defects can then be used to calculate the number of hairs in the follicular unit and thereby classify the follicular unit. It can be seen by the geometry of one or more hairs emanating from a single point that the number of hairs will be equal to one more than the number of defects. So, for a single hair FU there will be no defects so the FU will be an F1. For an FU with two hairs, there will be one defect between the two hairs so the FU will be an F2. For an FU with three hairs there will be two defects, one between the first and second hairs and another between the second and third hairs, so the FU will be an F3. And so on for follicular units having 4 or more hairs.

Figure 7:
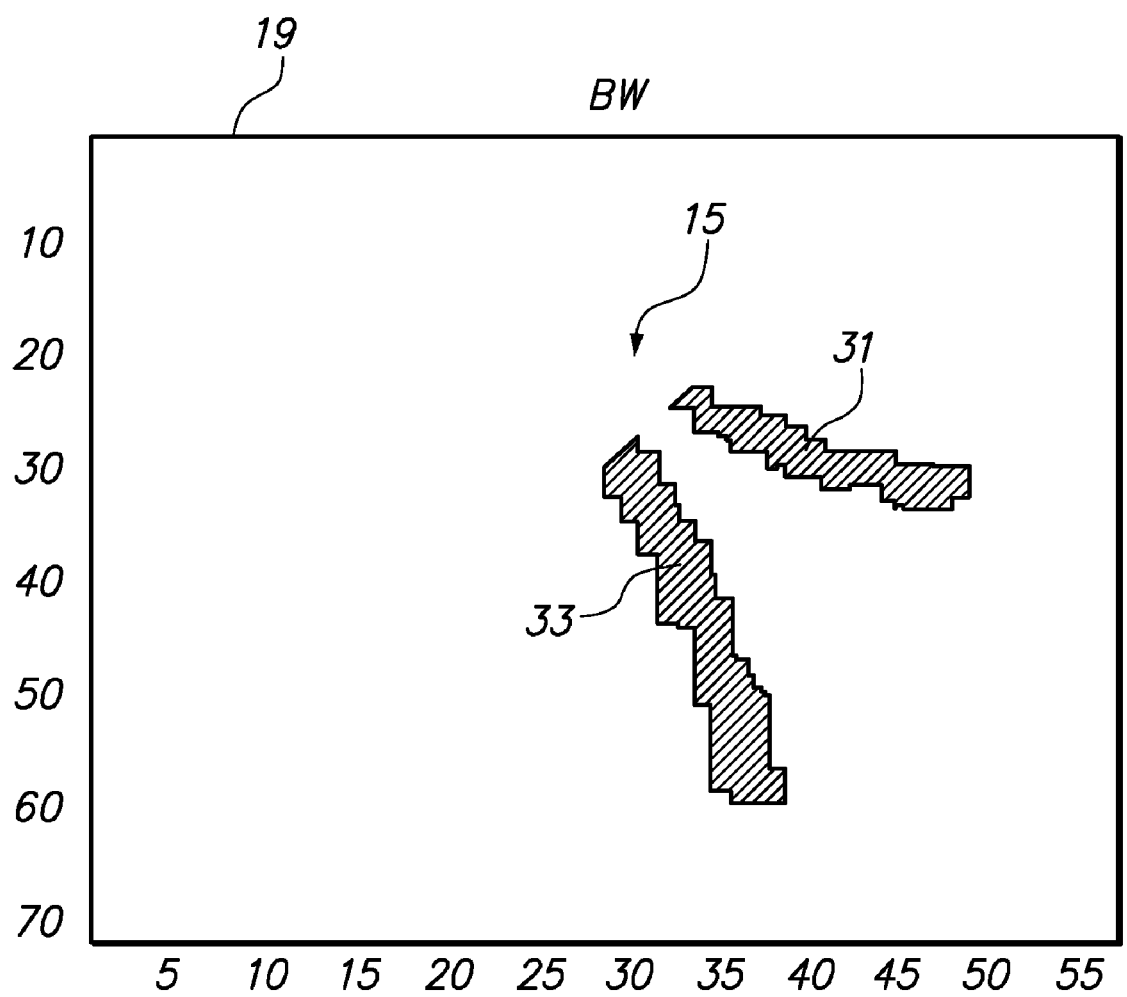
FIG. 7 is a print of a digital image which has been segmented which depicts hairs which appear to be separate but are actually part of the same follicular unit.

In some cases, the hairs of a single follicular unit may converge below the surface of the skin such that the binary image appears to have two separate hairs as shown in the example of FIG. 7. It is also possible that the hairs of a single follicular unit could appear as an F2 with two hairs emanating from a single point with a third hair slightly spaced apart, or similar situations. However, it is known that if what appears to be a separate hair is very close to another hair, it is likely that the hairs belong to the same follicular unit. This knowledge may be used to adjust the classification of the follicular unit to adjust for this situation. Therefore, to perform this adjustment, the distance between the hairs is determined using the digital image. Assuming that the hair 33 in FIG. 7 is a hair of the FU 15 of interest and hair 35 is a stray hair, then the method determines whether these hairs are part of the same follicular unit. First, the distance between the hairs 33 and 35 is calculated using the digital image. If the stray hair 35 is within a set maximum distance from the hair 33 of the FU 15 of interest, then it is assumed that the stray hair 35 is a part of the FU 15. The maximum distance between hairs which appear to be separate but are actually in the same follicular unit is about 0.5 mm, or 0.7 mm or 0.3 mm, or a distance determined based on the physical characteristics of the patient or a sampling of patients. Thus, the FU 15 is classified as having the single hair 33 plus the hair 35 resulting in a classification as an F2.

The method of adjusting for separate hairs in very close proximity ("proximity method") can be used in conjunction with the "defect" method described above. For instance, the defect method could be performed first and then the proximity method could be performed, or vice versa.

Figure 8:
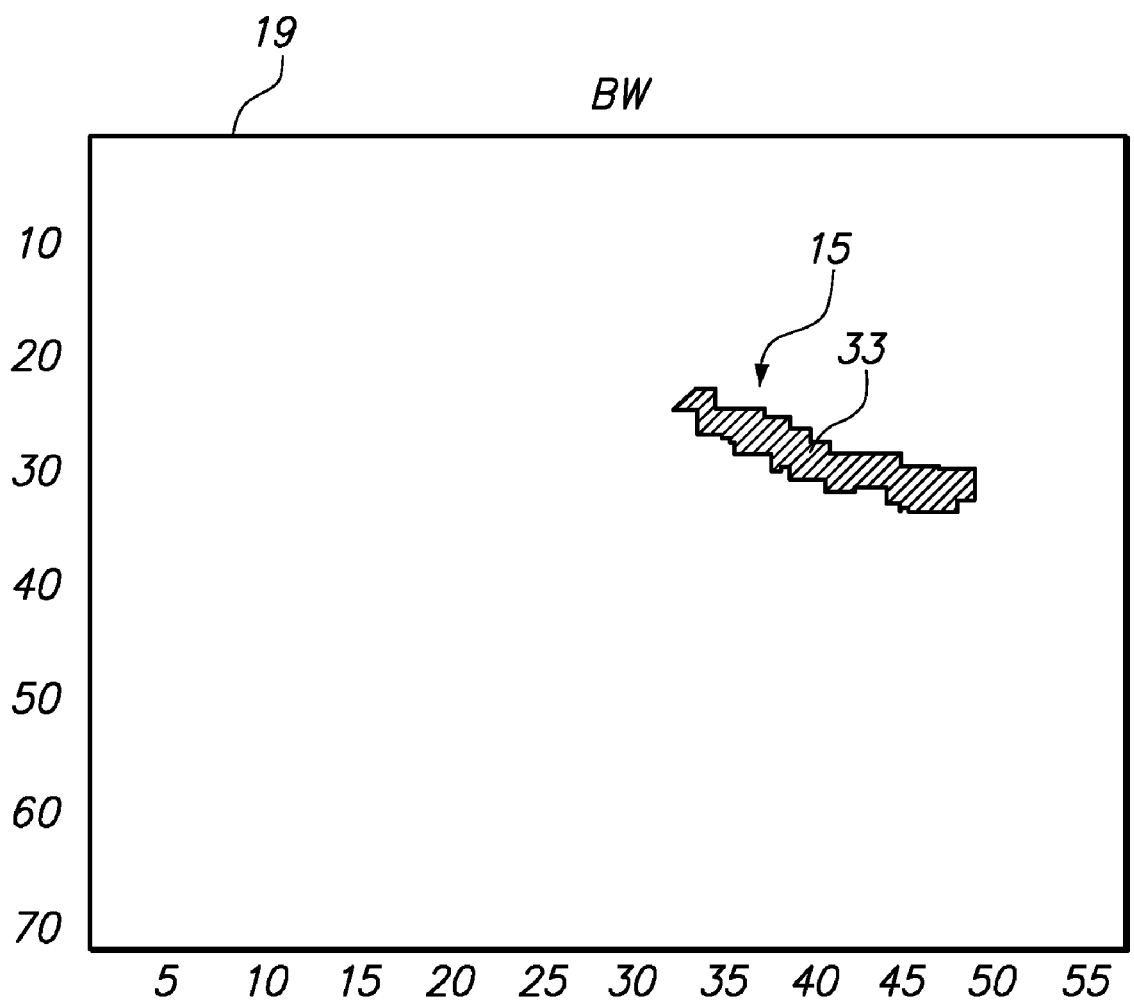
FIG. 8 is a print of a digital image which has been segmented which depicts what appears to be a single wide hair, but is actually two hairs of the same follicular unit.

Depending on the orientation of the camera(s) used to acquire the digital image of the region of interest 19, it is possible that an image appearing as a single hair could be two or more hairs whose images overlap from the angle of the camera. An example of this situation is depicted in FIG. 8. FIG. 8 is a print of a digital image which depicts an object that appears to be a single wide hair, but is actually two hairs of the same follicular unit 15. To account for this situation in the classification of the FU 15, the width of each object 33 representing a hair in the FU 15 is determine using the digital image. Then, it is determined whether the width of each object 33 representing a hair exceeds a maximum expected width for a single hair. A single hair is known to have a width of between about 50 microns ("um") and 100 um, with an average of about 75 um.

Then, the step of classifying a follicular unit can also be based on a determination whether the width of an object representing a hair exceeds the maximum expected width. For example, if the width is between 1½ and 2 times the expected width, then the step of classifying will approximate such object as being two hairs. A similar approximation can be done for 3, 4 or 5 hairs. This "width adjustment method" can be done in conjunction with either or both the defect method and the proximity method described above, and in any order.

Any or all of the systems and methods for classifying a follicular unit as described herein may be used in conjunction with the system and method of harvesting and transplanting hair as described in U.S. patent application Ser. No. 11/380, 903 and U.S. patent application Ser. No. 11/380,907.

The foregoing illustrated and described embodiments of the invention are susceptible to various modifications and alternative forms, and it should be understood that the invention generally, as well as the specific embodiments described herein, are not limited to the particular forms or methods disclosed, but to the contrary cover all modifications, equivalents and alternatives falling within the scope of the appended claims. By way of non-limiting example, it will be appreciated by those skilled in the art that the invention is not limited to the use of a robotic system including a robotic arm, and that other automated and semi-automated systems may be utilized. Moreover, the system and method of classifying follicular units of the present invention can be a separate system used along with a separate automated transplantation system or even with a manual transplantation procedure.

What is claimed is:

1. A method of classifying a follicular unit (FU) based on a number of hairs emanating from the FU, comprising:
   using a processor for processing an image of a body surface containing an FU to produce a segmented image of the FU;
   calculating a contour of the segmented image of the FU;
   calculating an outline profile of the segmented image which disregards concavities in the contour of the segmented image of the FU;
   determining the number of defects in the outline profile; and
   classifying the FU at least partially based on the number of determined defects.

2. The method of claim 1, wherein calculating an outline profile comprises calculating a convex hull contour.

3. The method of claim 1, wherein classifying the FU comprises classifying the FU as either a single hair FU or a multiple hair FU.

4. The method of claim 1, wherein in classifying the FU, a number of hairs emanating from the FU equals the determined number of defects in the outline profile plus one.

5. The method of claim 1, wherein the image of a body surface containing an FU is a digital image.

6. The method of claim 1, further comprising:
   positioning a first camera and a second camera to be directed at the body surface, said cameras configured to provide stereo images;
   obtaining a first image from said first camera and selecting an FU within said first image;
   obtaining a second image from said second camera and selecting the same FU within said second image;
   tracking said FU within said first and second images;
   aligning said first and second cameras with an orientation of a hair of said FU; and
   acquiring the image of said FU with said first and second cameras aligned with the orientation of said hair.

7. The method of claim 1, further comprising:
   selecting a region of interest in close proximity to the FU;
   determining if the region of interest contains an image of a separate hair which is not a contiguous part of the contour of the FU; and
   determining whether the separate hair is within a maximum distance from one or more hairs defining the contour of the FU,
   wherein classifying the FU is additionally based on the whether the separate hair is determined to be within a maximum distance from the hair(s) defining the contour of the FU.

8. The method of claim 7, wherein the FU is classified as including each separate hair located within the maximum distance from the hair(s) defining the contour of the FU.

9. The method of claim 1, further comprising determining the width of each object representing a hair in the FU, wherein classifying the FU is additionally based on a comparison of said width of each object representing a hair in the FU with a maximum expected width for a single hair.

10. The method of claim 9, wherein determining the width includes determining a major axis and minor axis of each object representing a hair in the FU, wherein the major axis is along a length of the object representing a hair and the minor axis is transverse to the major axis.

11. The method of claim 1, further comprising acquiring the image of a body surface containing an FU, and wherein acquiring the image comprises acquiring one or more image of the same FU.

12. The method of claim 1, further comprising tracking the FU to adjust for relative movement between an image acquisition device and the FU.

13. The method of claim 1, further comprising tracking the FU by:
   acquiring a first image of the FU from an image acquisition device;
   determining a position of the FU from said first image;
   acquiring a second image of the FU from the image acquisition device; and
   determining a position of the FU from said second image.

14. The method of claim 13, wherein the image acquisition device comprises at least one camera.

15. A system for classifying a follicular unit (FU) based on the number of hairs emanating from the FU, comprising:

an image acquisition device; and an image processor, the image processor configured for
- processing an image obtained by the image acquisition device to produce a segmented image of the FU;
- calculating a contour of the segmented image of the FU;
- calculating an outline profile of the segmented image which disregards concavities in the calculated contour of the segmented image of the FU;
- determining the number of defects in the outline profile; and
- classifying the FU at least partially based on the number of determined defects.

16. The system of claim 15, wherein the image acquisition device comprises at least one camera.

17. The system of claim 15, wherein the image acquisition device is a stereo imaging device.

18. The system of claim 15, wherein the image processor is a personal computer.

19. The system of claim 15, wherein the system is a robotic system.

20. The system of claim 19, further comprising a robotic arm on which said image acquisition device is mounted.

21. The system of claim 20, further comprising a controller operatively coupled to said robotic arm and said image processor.

22. The system of claim 15, wherein the image acquisition device acquires digital images.

* * * * *

UNITED STATES PATENT AND TRADEMARK OFFICE
CERTIFICATE OF CORRECTION

PATENT NO. : 7,477,782 B2 Page 1 of 1
APPLICATION NO. : 11/467268
DATED : January 13, 2009
INVENTOR(S) : Shehrzad A. Qureshi and Mohan Bodduluri It is certified that error appears in the above-identified patent and that said Letters Patent is hereby corrected as shown below:

Column 3, line 40, replace "minus" with --plus--.

Signed and Sealed this

Twenty-third Day of November, 2010

David J. Kappos
*Director of the United States Patent and Trademark Office*